United States Patent
Kawaguchi

(10) Patent No.: US 10,255,006 B2
(45) Date of Patent: Apr. 9, 2019

(54) ELECTRONIC DEVICE FOR UPDATING DEVICE FIRMWARE

(71) Applicant: KYOCERA Document Solutions Inc., Osaka (JP)

(72) Inventor: Tomoya Kawaguchi, Osaka (JP)

(73) Assignee: KYOCERA Document Solutions, Osaka (JP)

( * ) Notice: Subject to any disclaimer, the term of this patent is extended or adjusted under 35 U.S.C. 154(b) by 0 days.

(21) Appl. No.: 15/582,489

(22) Filed: Apr. 28, 2017

(65) Prior Publication Data

US 2017/0315799 A1 Nov. 2, 2017

(30) Foreign Application Priority Data

Apr. 28, 2016 (JP) ................. 2016-090546

(51) Int. Cl.
*G06F 9/445* (2018.01)
*G06F 13/10* (2006.01)
(Continued)

(52) U.S. Cl.
CPC ............ *G06F 3/1203* (2013.01); *G06F 3/123* (2013.01); *G06F 3/1284* (2013.01); *G06F 8/65* (2013.01);
(Continued)

(58) Field of Classification Search
CPC .... G06F 13/42; G06F 13/102; G06F 13/4068; G06F 13/4022; G06F 13/20; G06F 13/38;
(Continued)

(56) References Cited

U.S. PATENT DOCUMENTS

| 7,558,702 B2 * | 7/2009 | Iwasa | G06F 11/0745 |
| | | | 702/183 |
| 8,140,733 B2 * | 3/2012 | Wong | G06F 21/44 |
| | | | 710/313 |

(Continued)

FOREIGN PATENT DOCUMENTS

| JP | 2005-182418 A | 7/2005 |
| JP | 2007-069514 A | 3/2007 |

(Continued)

OTHER PUBLICATIONS

Henry Corrigan-Gibbs et al., FlashPatch: Spreading Software Updates over Flash Drives in Under-connected Regions, Dec. 5-6, 2014, [Retrieved on Dec. 27, 2018]. Retrieved from the internet: <URL: https://dl.acm.org/citation.cfm?id=2674384> 10 Pages (1-10) (Year: 2014).*

(Continued)

*Primary Examiner* — Anibal Rivera
(74) *Attorney, Agent, or Firm* — Hawaii Patent Services; Nathaniel K. Fedde; Kenton N. Fedde

(57) ABSTRACT

Provided is an electronic device that includes an update-processing unit that updates a control program for the device based on an update program that is recorded on a recording medium. The electronic device includes a USB interface and an update-control unit. Devices can be connected to the USB interface. The update-control unit determines whether or not a device is connected to the USB interface when the power is turned ON, and when a device is connected, waits when it is not possible to immediately determine whether or not that devices is the recording medium.

2 Claims, 3 Drawing Sheets

(51) Int. Cl.
   *G06F 13/28* (2006.01)
   *G06F 9/44* (2018.01)
   *G06F 3/12* (2006.01)
   *G06F 9/4401* (2018.01)
   *G06F 13/42* (2006.01)
   *H04N 1/00* (2006.01)
   *G06F 8/65* (2018.01)
   *G06F 3/16* (2006.01)

(52) U.S. Cl.
   CPC ........ *G06F 9/4411* (2013.01); *G06F 13/4282* (2013.01); *H04N 1/00* (2013.01); *G06F 3/1206* (2013.01); *G06F 3/167* (2013.01)

(58) Field of Classification Search
   CPC ... G06F 8/665; G06F 8/65; G06F 8/71; G06F 8/66; G06F 11/0745; G06F 9/4408; G06F 9/44; G06F 9/4415; G06F 21/572; G06F 21/44
   See application file for complete search history.

(56) References Cited

U.S. PATENT DOCUMENTS

| | | | |
|---|---|---|---|
| 8,868,796 B1* | 10/2014 | Wojcik | G06F 8/71 710/8 |
| 9,582,229 B2* | 2/2017 | Shimizu | G06F 3/1231 |
| 9,807,268 B2* | 10/2017 | Yasukawa | B41J 29/38 |
| 2002/0095501 A1* | 7/2002 | Chiloyan | G06F 9/4415 709/227 |
| 2006/0104238 A1* | 5/2006 | Hibino | H04W 8/20 370/328 |
| 2006/0221378 A1* | 10/2006 | Asahara | G03G 15/50 358/1.14 |
| 2006/0282833 A1* | 12/2006 | Choe | G06F 8/65 717/171 |
| 2007/0065119 A1* | 3/2007 | Pomerantz | G06F 13/38 386/231 |
| 2007/0168573 A1* | 7/2007 | Kim | G06F 8/65 710/10 |
| 2007/0219748 A1* | 9/2007 | Iwasa | G06F 11/0745 702/182 |
| 2008/0307157 A1* | 12/2008 | Jang | G06F 8/65 711/103 |
| 2010/0241963 A1* | 9/2010 | Kulis | G06F 3/167 715/727 |
| 2011/0235123 A1* | 9/2011 | Suzuki | B41J 29/393 358/1.16 |
| 2012/0042099 A1* | 2/2012 | Wong | G06F 21/44 710/9 |
| 2012/0079563 A1* | 3/2012 | Green | G06F 21/572 726/3 |
| 2013/0007430 A1* | 1/2013 | Fan | G06F 8/654 713/1 |
| 2013/0132614 A1* | 5/2013 | Bajpai | G06F 8/654 710/10 |
| 2013/0179671 A1* | 7/2013 | Tsai | G06F 13/20 713/2 |
| 2013/0318513 A1* | 11/2013 | Chu | G06F 8/654 717/168 |
| 2015/0074323 A1* | 3/2015 | Chumbalkar | G06F 13/4022 710/316 |
| 2015/0082056 A1* | 3/2015 | Hsieh | G06F 1/266 713/300 |
| 2015/0146221 A1* | 5/2015 | Hill | G06F 3/1206 358/1.6 |
| 2015/0154399 A1* | 6/2015 | Tsuchitoi | G06F 21/572 726/22 |
| 2015/0186150 A1* | 7/2015 | Chung | G06F 9/4408 711/103 |
| 2015/0229791 A1* | 8/2015 | Scaff | G06F 3/1204 358/1.15 |
| 2016/0004526 A1* | 1/2016 | Hsu | G06F 8/654 713/100 |
| 2016/0188430 A1* | 6/2016 | Nitta | G06F 8/65 714/6.3 |
| 2016/0210090 A1* | 7/2016 | Shimizu | G06F 3/1231 |
| 2016/0210140 A1* | 7/2016 | Meng | G06F 9/4411 |
| 2016/0234396 A1* | 8/2016 | Yasukawa | B41J 29/38 |
| 2016/0291962 A1* | 10/2016 | Michishita | G06F 8/654 |
| 2016/0299865 A1* | 10/2016 | Hetzler | G06F 13/4068 |
| 2016/0360045 A1* | 12/2016 | Doyle, Sr. | H04N 1/00042 |
| 2017/0046284 A1* | 2/2017 | Doria | G06F 13/102 |
| 2017/0123449 A1* | 5/2017 | Ahmed | G06F 1/16 |

FOREIGN PATENT DOCUMENTS

| | | |
|---|---|---|
| JP | 2007-249761 A | 9/2007 |
| JP | 2008-162054 A | 7/2008 |
| JP | 2009-032076 A | 2/2009 |
| JP | 2012-242980 A | 12/2012 |
| JP | 2014-026545 A | 2/2014 |
| JP | 2014-071718 A | 4/2014 |
| WO | 2015072559 A1 | 5/2015 |

OTHER PUBLICATIONS

G. Zappala, A versatile software-hardware system for environmental data acquisition and transmission, 2009, [Retrieved on Dec. 27, 2018]. Retrieved from the internet: <URL: https://www.witpress.com/Secure/elibrary/papers/CMEM09/CMEM09026FU1.pdf> 12 Pages (283-294) (Year: 2009).*

Office Action from Japan Patent Office dated Nov. 27, 2018.

* cited by examiner

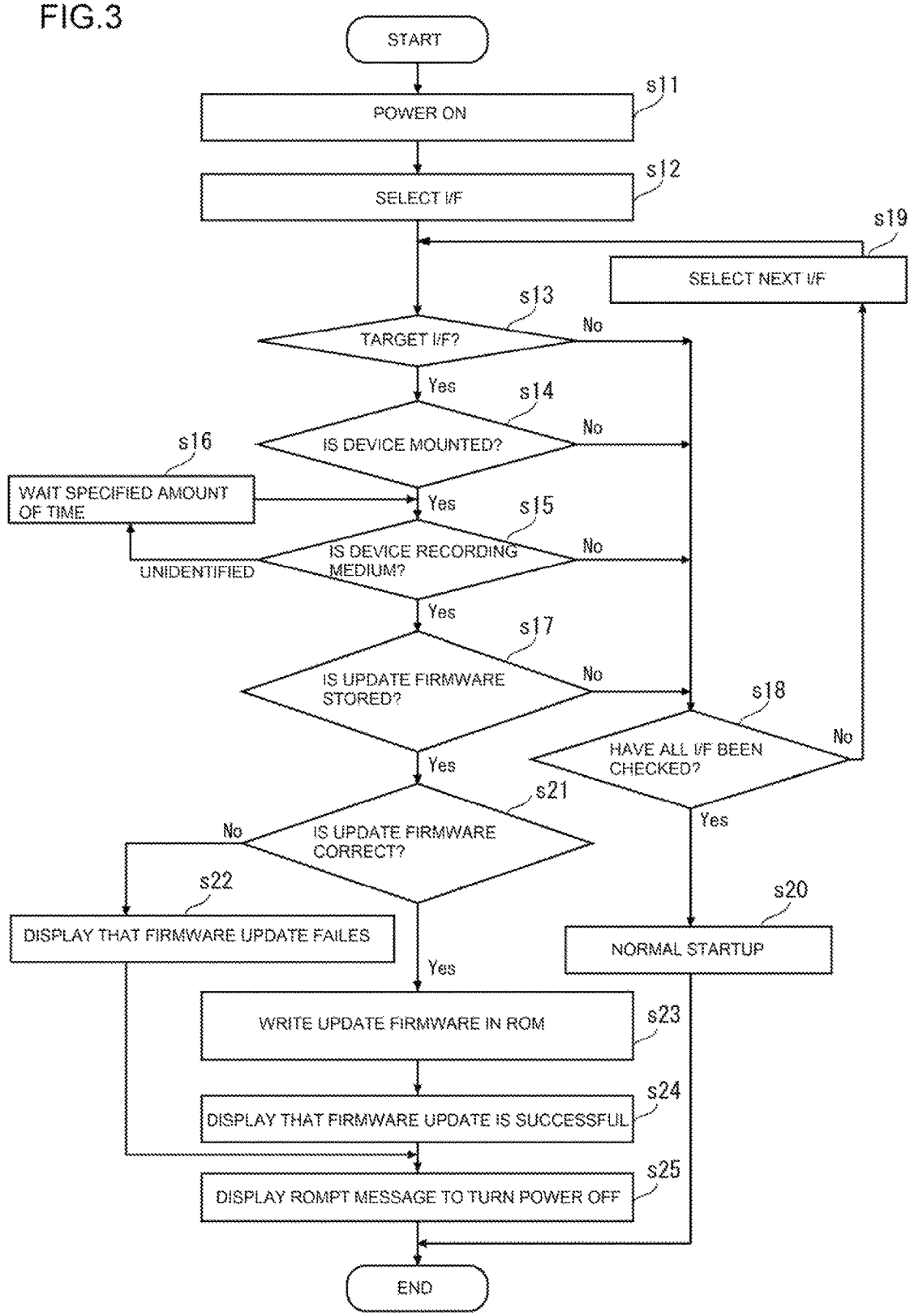

ELECTRONIC DEVICE FOR UPDATING DEVICE FIRMWARE

INCORPORATION BY REFERENCE

This application is based on and claims the benefit of priority from Japanese Patent Application No. 2016-090546 filed on Apr. 28, 2016, the contents of which are hereby incorporated by reference.

BACKGROUND

The present disclosure relates to an electronic device for updating device firmware by using a recording medium on which update firmware is recorded.

In recent years, many electronic devices include a USB (Universal Serial Bus) interface, and can be used by simply connecting a peripheral device such as a USB keyboard, IC card reader, USB memory and the like. Also many kinds of image-forming devices such as copiers, multifunction machines and the like that are electronic devices that include a USB interface are becoming widespread. For this kind of image-forming device, firmware update work occurs, and technology is proposed for updating firmware using USB memory. In typical technology, USB memory in which update firmware is recorded is mounted in the image-forming device, and when a firmware update instruction is given from an operation unit when the image-forming device is in an activated state, firmware is updated based on the update firmware that is recorded in the USB memory.

Firmware update may also be performed at the place of production of the image-forming device. In that case, the work for updating firmware is performed on the factory line, so the work must be completely performed in a short period of time. Therefore, at startup (when the power is turned ON), the image-forming device automatically and immediately determines whether or not USB memory is mounted in the USB interface, and when it is determined that USB memory is mounted, performs firmware update based on the update firmware that is recorded in the USB memory.

SUMMARY

The electronic device of this disclosure is an electronic device that includes an update-processing unit that updates a control program for the device based on an update program that is recorded on a recording medium. The electronic device includes a USB interface and an update-control unit. Devices can be connected to the USB interface. The update-control unit determines whether or not a device is connected to the USB interface when the power is turned ON, and when a device is connected, waits when it is not possible to immediately determine whether or not that device is the recording medium.

BRIEF DESCRIPTION OF THE DRAWINGS

FIG. 3 is a flowchart illustrating the flow of a firmware update process that is executed when starting the image-forming device illustrated in FIG. 1.

DETAILED DESCRIPTION

In the following, an embodiment of the present disclosure will be explained in detail with reference to the drawings. In the embodiment described below, the same reference numbers will be used for configuration that expresses the same function.

Figure 1:
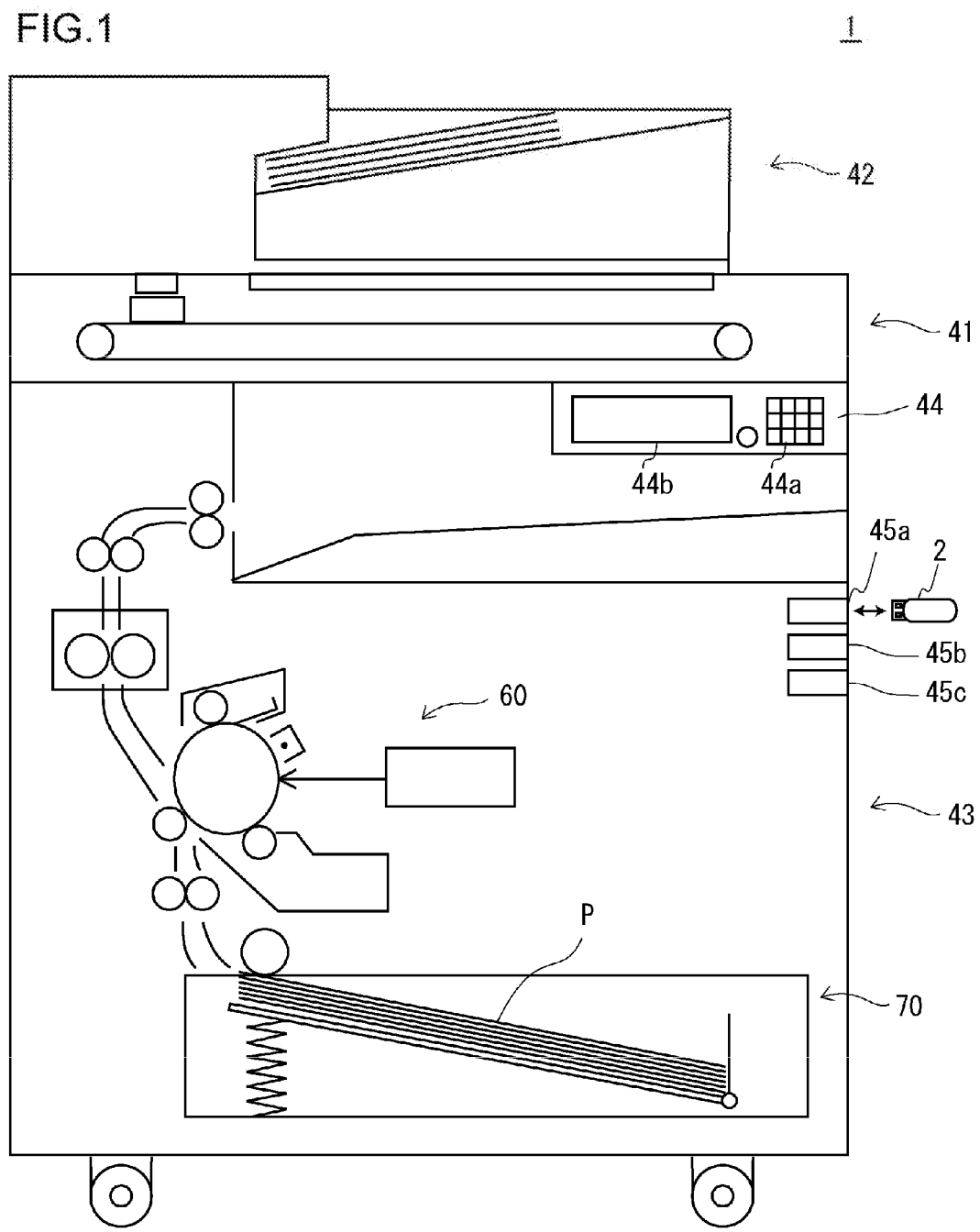
FIG. 1 is a schematic cross-sectional view of an image-forming device of an embodiment of the present disclosure.

The image-forming device 1 is an electronic device such as a copier or multifunctional device, and referring to FIG. 1, includes a document-reading unit 41, a document-feeding unit 42, and main unit 43, an operation unit 44, and USB I/Fs (USB interfaces) 45a to 45c. The document-reading unit 41 is arranged on the upper section of the main unit 43. The document-feeding unit 42 is arranged on the upper section of the document-reading unit 41. The operation unit 44 includes operating buttons 44a such as a start key, ten-key and the like, and a display unit 44b, and is arranged on the front side of the image-forming device 1.

The USB I/Fs 45a to 45c are insert ports (USB ports) for peripheral devices having a USB connector, the number is not limited to 3, however should be one or more. The peripheral device may be a USB keyboard, IC card reader, USB memory that is a recording medium 2, and the like. The USB I/F 45a and USB I/F 45b are both set as a target I/F for receiving the connection of the recording medium 2 that stores the update firmware. In other words, when performing firmware update of the image-forming device 1, the recording medium 2 that stores the update firmware must be inserted into the USB I/F 45a or USB I/F 45b. In that case, even though the recording medium 2 that stores the update firmware is inserted into the USB I/F 45c, firmware update will not be performed. This is so that the processing time for checking whether or not the recording medium 2 that stores the update firmware is connected can be shortened. At least one of the USB I/Fs 45a to 45c must be set as a target I/F. Moreover, the I/F of the image-forming device 1 is not limited to being a USB I/F, and it is also possible to provide an insert port for an LAN (Local Area Network) cable, an insert port for a SD (Secure Digital) card, and the like.

The document-reading unit 41 includes a scanner, a platen glass, and a document-reading slit. The document-reading unit 41, when reading a document that is placed on the platen glass, moves the scanner to a position facing the platen glass and acquires image data by scanning and reading the document that is placed on the platen glass, then outputs the acquired image data to the main unit 43. Moreover, the document-reading unit 41, when reading a document that is fed from the document-feeding unit 42, moves the scanner to a position facing the document-reading slit, and by way of the document-reading slit, acquires image data by reading the document in synchronization with the feeding operation by the document-feeding unit 42, then outputs the acquired data to the main unit 43.

The document-feeding unit 42 includes a document-placement unit and a document-transporting mechanism. The document-feeding unit 42 feeds documents that are placed on the document-placement unit in order one sheet at a time by the document-transporting mechanism to the document-reading unit 41.

The main unit 43, together with including a printing unit 60, also includes a paper-supply unit 70. The paper-supply unit 70 outputs printing paper P one sheet at a time to the printing unit 60.

The printing unit 60 includes a photosensitive drum, a charging unit, an exposing unit, a developing unit, a transfer unit, a fixing unit and the like. The printing unit 60 prints a toner image on the printing paper P by executing an image-forming process that includes charging, exposing, developing, transferring and fixing.

Figure 2:
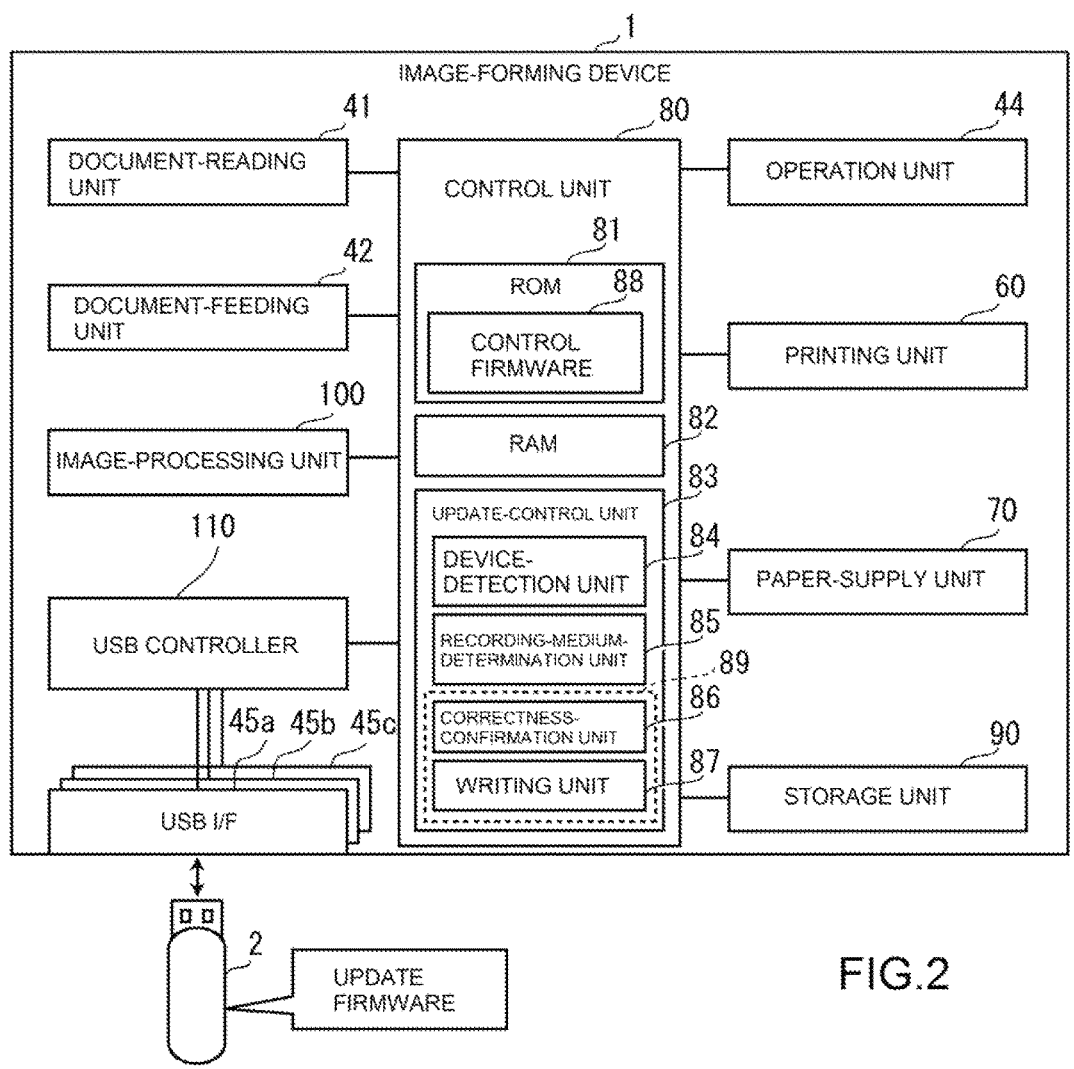
FIG. 2 is a function block diagram illustrating the outline configuration of the image-forming device illustrated in FIG. 1.

FIG. 2 is a function block diagram that illustrates the outline configuration of the image-forming device 1. The document-reading unit 41, the document-feeding unit 42, the operation unit 44, the printing unit 60 and the paper-supply unit 70 described above are connected to the control unit 80, and operations are controlled by the control unit 80. Moreover, a storage unit 90, an image-processing unit 100 and a USB controller 110 are connected to the control unit 80.

The storage unit 90 is storage means such a semiconductor memory, HDD (Hard Disk Drive) and the like, and stores image data that is acquired by the document-reading unit 41 reading a document.

The image-processing unit 100 is means for performing specific image processing on image data, and for example, performs image improvement processing such as enlargement or reduction processing, density adjustment, gradation adjustment and the like.

The USB controller 110 is connected to each of the USB I/Fs 45a to 45c, and has a function for communicating with peripheral devices that are connected to the USB I/Fs 45a to 45c.

The control unit 80 is an information-processing unit such as a microcomputer that includes a ROM (Read Only Memory) 81 and RAM (Random Access Memory) 82. The ROM 81 is nonvolatile and includes a flash memory or the like. The RAM 82 is the main memory. Control firmware 88 for performing operation control of the image-forming device is stored in the ROM 81. The control unit 80 reads the control firmware 88 that is stored in the ROM 81, and by expanding the control firmware 88 in the RAM 82, performs control of the entire device according to specific instruction information that is inputted from the operation unit 44.

Moreover, at the startup of the image-forming device 1, the control unit 80 determines whether or not a recording medium 2 on which update firmware is recorded is mounted, and when a recording medium is mounted, determines whether the update firmware that is recorded on the recording medium 2 is correct, and when the update firmware is correct, the control unit 80 functions as an update-control unit 83 that performs control for updating the control firmware 88 with the update firmware. The update-control unit 83 includes a device-detection unit 84, a recording-medium-determination unit 85, and an update-processing unit 89. The device-detection unit 84, by way of the USB controller 110, detects whether a device is mounted to the USB I/Fs 45a to 45c. The recording-medium-determination unit 85 determines whether or not a mounted device is a recording medium 2. The update-processing unit 89 updates the control firmware based on update firmware that is recorded on the recording medium 2. The update-processing unit 89 includes a correctness-confirmation unit 86 and a writing unit 87. The correctness-confirmation unit 86 verifies the correctness of the update firmware. The writing unit 87 writes the correct update firmware to the ROM 81.

Next, referring to FIG. 3, the flow of the firmware update process for the image-forming device 1 at the time of startup (when the power is turned ON) of the image-forming device 1 will be explained.

After the power to the image-forming device 1 is turned ON (step s11), the device-detection unit 84 selects an I/F from among the I/Fs (USB I/Fs 45a to 45c) of the image-forming device 1 (step s12). Next, the device-detection unit 84 determines whether or not the selected I/F is a target I/F (USB I/F 45a or 45b) that is preset as a connection port for update firmware (step s13), and when the selected I/F is not a target I/F (NO in step s13), processing advances to step s18. By limiting the I/F for firmware update to a target I/F in this way, it is possible to shorten the processing time.

When the selected I/F is a target I/F (YES in step s13), the device-detection unit 84, by way of the USB controller 110, determines whether or not a device is mounted to the target I/F (step s14). When the device-detection unit 84 determines that a device is not mounted to the target I/F (NO in step s14), processing advances to step s18.

When the device-detection unit 84 determines that some device is mounted to a target I/F (YES in step s14), the recording-medium-determination unit 85, by way of the USB controller 110, determines whether or not the device that is mounted to a target I/F is the recording medium 2 (step s15). When the recording-medium-determination unit 85 is unable to immediately identify whether or not the device that is mounted to the target I/F is a recording medium 2 (unidentified in step s15), the recording-medium-determination unit 85 waits for a specified amount of time (step s16), then returns to the process (step s15) for determining whether or not the device that is mounted to the target I/F is a recording medium 2. When this specified amount of time is, for example, about 5 seconds, and the mounted device is a USB memory, the recording-medium-determination unit 85 is able to determine that the mounted device is a recording medium 2 irrespective of the type of USB memory. Moreover, the processing time may also be shortened by making the specified amount of time shorter than 5 seconds (for example, about 1 second) so that the time required for the recording-medium-determination unit 85 to determine whether or not the device is a recording medium 2 differs according to the type of recording medium 2. The recording medium 2 may also be a memory card (SD card or the like) that is mounted in a memory-card reader having a USB connector.

When the recording-medium-determination unit 85 determines that the device that is mounted to the target I/F is not a recording medium 2 (NO in step s15), or in other words, when the device that is mounted is an IC card reader, USB keyboard or the like, processing advances to step s18.

However, when the recording-medium-determination unit 85 determines that the device that is mounted to the target I/F is a recording medium 2 (YES in step s15), the correctness-confirmation unit 86 determines whether or not update firmware is stored on the recording medium 2 (step s17). Update firmware is such that a preset keyword is attached to the file name. Therefore, the correctness-confirmation unit 86 can determine whether or not there is update firmware based on the file name of the data that is recorded on the recording medium 2.

When the correctness-confirmation unit 86 determines that update firmware is not stored on the recording medium 2 (NO in step s17), processing advances to step s18.

When the device-detection unit 84 determines that a checked I/F is not a target I/F (NO in step s13), a device is not mounted even though the I/F is a target I/F (NO in step s14), the device is not a recording medium 2 even though a device is mounted (NO in step s15), and update firmware is not stored even though the device is a recording medium 2 (NO in step s17), the device-detection unit 84 determines whether or not all of the I/F have been checked (step s18). When not all of the I/F have been checked (NO in step s18), the device-detection unit 84 selects the next I/F (step s19), and returns to the process for determining whether or not the I/F is a target I/F (step s13).

However, when the device-detection unit 84 has finished checking all of the I/F (YES in step s18), the control unit 80 performs normal startup of the image-forming device 1 (step s20), and this processing ends. Therefore, it is possible to perform normal startup when update of the firmware is not necessary.

However, when it is determined that update firmware is stored on the recording medium 2 (YES in step s17), the correctness-confirmation unit 86 determines whether or not the update firmware that is stored on the recording medium 2 is correct (step s21). Verification information such as a check sum or signature information for verifying correctness is attached to the update firmware, and the correctness-confirmation unit 86 can verify the correctness of the update firmware based on the verification information.

When it is determined by the correctness-confirmation unit 86 based on the verification information that the update firmware is not correct (NO in step s21), the update-control unit 83 controls the writing unit 87 so as not to update the control firmware 88, and displays that firmware update failed on the display unit 44b (step s22). Continuing, the update-control unit 83 displays a message prompting to turn the power OFF on the display unit 44b (step s25), and ends this processing.

However, when it is determined by the correctness-confirmation unit 86 that the update firmware is correct (YES in step s21), the update-control unit 83 controls the writing unit 87 to read the update firmware from the recording medium 2 and to write that update firmware in the ROM 81 (step s23). As a result, the update firmware 88 that is recorded in the ROM 81 is updated with correct update firmware. Then, the update-control unit 83 displays that firmware update is successful on the display unit 44b (step s24), and displays a message prompting to turn the power OFF on the display unit 44b (step s25), and ends this processing. As a result, line workers at the factory or the like can simply determine whether firmware update is successful or failed. In addition to displaying a message on the display unit 44b notifying that update is successful or failed, the update-control unit 83 may also give notification using sound, flashing or lighting of LED lamps, and the like.

In this way, the image-forming device 1 of this embodiment that are electronic devices that include an update-processing unit 89 that updates a control program (control firmware 88) of a device based on an update program (update firmware) that is recorded on a recording medium 2, and includes USB interfaces (USB I/Fs 45a to 45c) and a update-control unit 83. Devices are connected to the USB interfaces (USB I/Fs 45a to 45c). The update-control unit 83, when the power is turned ON, determines whether or not a device is connected to a USB interface, and when there is a device that is connected, waits when it is not possible to immediately determine whether or not the device is a recording medium 2.

As a result, when the power is turned ON to the image-forming device 1 when a recording medium 2 on which an update program is recorded is mounted to a USB I/F 45b or 45c, the update-control unit 83 detects that a device is mounted to a USB interface, and waits until it is possible to determine whether or not the mounted device is a recording medium 2. By the update-control unit 83 waiting, it is possible to wait for a response from the recording medium 2 even when communication between the USB controller 110 and the recording medium 2 is stalled due to a self-check or the like by the recording medium 2, and can certainly determine whether or not a device is a recording medium 2. Therefore, there is no attempt to read update firmware from a device when it is not clear what the mounted device is, and processing is not performed on an unknown device, so it is possible to certainly read update firmware that is recorded on a recording medium 2 and to update the control firmware 88 regardless of the type of recording medium 2.

Moreover, the update-control unit 83 determines whether or not a device is a recording medium 2 only when a device is detected as being mounted to a USB interface when the power to the image-forming device is turned ON, so it is possible to reduce the check time that accompanies update processing. Furthermore, the update-control unit 83 checks the correctness of the update firmware that is recorded on a recording medium 2 and updates the control firmware 88 with update firmware only when the update firmware is confirmed as being correct. As a result, it is possible to improve the security of the firmware update. When a recording medium 2 on which update firmware is recorded is mounted in a target I/F, the update-control unit 83 notifies whether or not update is successful, so it is possible to easily and certainly notify a user of the firmware update results. Moreover, depending on whether or not a recording medium 2 on which update firmware is recorded is mounted when the power is turned ON, the update-control unit 83 executes firmware update or normal startup, so the operation time by the user can be shortened. In the embodiment described above, an example is explained in which firmware is updated, however, as long as a program is being updated, it is also possible to update an application program, for example.

In recent years, various kinds of USB memory have become widespread, and depending on the kind of USB memory that is mounted, there are times when an image-forming device can or cannot immediately determine whether or not a device that is mounted to a USB interface is a USB memory. In typical technology when an image-forming device is not able to immediately determine whether or not a mounted device is a USB memory, there is a problem in that reading update firmware from a USB memory fails, and updating firmware that originally should have succeeded, fails.

Taking into consideration the problems described above, the object of the present disclosure is to provide technology that makes it possible to certainly update the firmware of an electronic device in a short amount of time using a recording medium on which update firmware is recorded.

With the present disclosure, it is possible to certainly update the firmware of an electronic device in a short amount of time using a recording medium on which update firmware is recorded.

The present disclosure is not limited to the embodiment described above, and needless to say, various modifications can be made without departing from the scope of the present disclosure.

What is claimed is:

1. An electronic device comprising an update-processing unit for updating a control program for the electronic device based on an update program that is recorded on a recording medium, and further comprising:
   a USB interface to which devices can be connected;
   an update-control unit that determines whether or not a device is connected to the USB interface when the power is turned ON, and when there is a device that is connected to the USB interface, waits when it is not possible to immediately determine whether or not the device that is connected to the USB interface is the recording medium,
   wherein
   the update-control unit further comprises a correctness-confirmation unit that, when the device that is connected to the USB interface is the recording medium, determines whether or not the update program is recorded on the recording medium;

the correctness-confirmation unit determines whether there is the update program based on whether a preset keyword is attached to a filename present on the recording medium;

the correctness-confirmation unit, when it is determined that the update program is recorded, confirms the correctness of the update program;

when the correctness cannot be confirmed, the correctness-confirmation unit controls the update-processing unit so as not to update the control program and notifies that update fails, and the update-control unit displays a message prompting to turn the power OFF;

when correctness can be confirmed, the correctness-confirmation unit controls the update-processing unit so as to update the control program based on the update program and notifies that update is successful; and the update-control unit, when it is determined that a recording medium on which the update program is recorded is not connected to the USB interface, allows the electronic device to startup normally.

2. The electronic device according to claim 1, wherein plural USB interfaces are provided; and the update-control unit comprises:

a device-detection unit that detects whether or not the device that is connected to the USB interface is connected to only a preset USB interface of the plural USB interfaces; and a recording-medium-determination unit that, when it is detected that the device that is connected to the USB interface is connected, determines whether or not the connected device is the recording medium, and waits a specified amount of time when a determination could not be made.

* * * * *